No. 743,817. PATENTED NOV. 10, 1903.
FRANK A. BREWER, Jr. & FRANK A. BREWER, Sr.
RIVETING DEVICE FOR DENTAL BRIDGEWORK.
APPLICATION FILED OCT. 9, 1902. RENEWED OCT. 15, 1903.
NO MODEL.
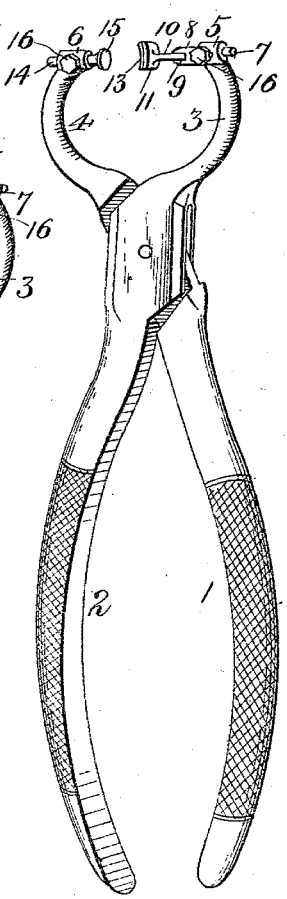
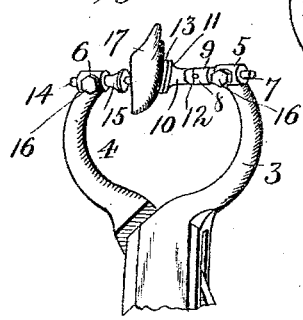
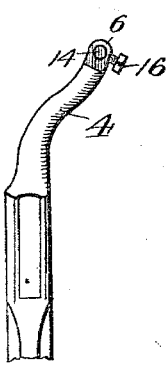
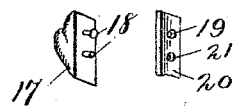
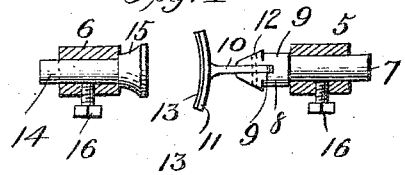
Inventors
Frank A. Brewer, Sr
Frank A. Brewer, Jr.
Witnesses No. 743,817. Patented November 10, 1903.

UNITED STATES PATENT OFFICE.

FRANK A. BREWER, JR., AND FRANK A. BREWER, SR., OF WATSONVILLE, CALIFORNIA.

RIVETING DEVICE FOR DENTAL BRIDGEWORK.

SPECIFICATION forming part of Letters Patent No. 743,817, dated November 10, 1903.

Application filed October 9, 1902. Renewed October 15, 1903. Serial No. 177,223. (No model.)

*To all whom it may concern:*

Be it known that we, FRANK A. BREWER, Jr., and FRANK A. BREWER, Sr., citizens of the United States, residing at Watsonville, in the county of Santa Cruz and State of California, have invented certain new and useful Improvements in Riveting Devices for Dental Bridgework; and we do declare the following to be a full, clear, and exact description of the invention, such as will enable others skilled in the art to which it appertains to make and use the same.

This invention relates to a riveting punch or tool for the use of dentists in fastening artificial teeth or tooth-facings to a backing or piece of bridgework while the same is permanently attached to the natural teeth within the human mouth, in the primal mounting of the bridgework, and for repair-work when the tooth or tooth-facing may have been broken off from the denture during mastication.

The object of the invention is to provide a tool of this character by means of which the operation of fastening the tooth or tooth-facing to its backing may be speedily and effectually accomplished at any point within the mouth and without injury to the tooth or tooth-facing or pain to the patient and which will form a firm and secure fastening.

With this and other objects in view, which will appear as the nature of the invention is better understood, the invention consists of a tool such as described embodying certain novel features of construction, combination, and arrangement of parts, which will be hereinafter more fully described, and particularly pointed out in the appended claims.

In the accompanying drawings, Figure 1 is a perspective view of a dental riveting device embodying our invention. Fig. 2 is a similar view of the jaws thereof, illustrating the manner of securing an artificial tooth or tooth-facing to its backing. Fig. 3 is a plan or edge view of the tool, showing the curvature of the jaws. Fig. 4 is a sectional view through the sockets of the jaws, die, and anvil, on an enlarged scale. Figs. 5 and 6 are detail views of the die and anvil. Fig. 7 is a detail view of a tooth or tooth-face and its backing prior to fastening. Fig. 8 is a sectional view of the same united.

Referring now more particularly to the drawings, the numerals 1 and 2 represent the bowed or curved handles of the tool, which are pivotally connected after the manner of forceps or pliers and provided with opposing jaws 3 and 4, having sockets 5 and 6 at their outer or free ends, which sockets are disposed at right angles to said jaws and in the plane of the path of movement of said handles. Each jaw is segmental in form, having an approximately semicircular curvature, and is offset so as to stand outward beyond one side of the body of the tool formed by said handles and at an acute angle thereto. By this construction sufficient space is formed between the jaws for the reception of the teeth of the patient between them and the proper clearance of said teeth, and the jaws of the tool are adapted to straddle the teeth of either jaw of the patient, so as to operate conveniently at any point within the mouth, as will more fully hereinafter appear.

In the socket 5 of the jaw 3 is mounted a pin or stem 7, which is enlarged at its inner end to form a head 8, which is formed with a transverse slot 9 for the reception of a shank 10, projecting from the center of the convex rear or under side of an anvil or bearing-plate 11, forming a support for the artificial tooth or tooth-face which is to be secured to its backing. The shank is pivotally mounted in said slot upon a pivot-pin 12, so as to adapt the anvil 11 to swing in a direction transversely of the jaw 3, and thus to have a limited rocking or oscillating movement for a purpose presently described. The anvil consists of a concavo-convex disk or plate, the concaved side whereof is inwardly disposed and is adapted to bear upon the front or convex surface of the artificial tooth or tooth-face and to conform approximately to the shape thereof. To prevent injury to the tooth, the said concaved face of the anvil is provided with a sheath, covering, or lining 13 of some soft yielding material—such, for instance, as felt or semivulcanized vulcanite—secured thereto by blind rivets or other suitable fastening means to avoid scratching or marring of the tooth or tooth-face.

In the socket 6 of the jaw 4 is mounted a riveting die or punch comprising a stem 14 having at its minor end a punch or die head 15, which coöperates with the anvil 11. The stems 7 and 14 are adjustably and removably mounted within the sockets 5 and 6 and are adapted to be held in fixed position by the set-screws 16. By loosening up these screws the anvil and die may be removed and reversed as to position in an obvious manner to adapt them to operate upon a tooth or tooth-face which cannot be reached by the arrangement of the parts shown in Figs. 1 and 2.

The tooth or tooth-face 17 is provided upon its rear face with projecting rivet-pins 18, which are adapted to pass through openings 19 in the backing or support 20, said openings being countersunk upon the outer side of the backing, as indicated at 21. The outer ends of the pins 18 are designed to be riveted to occupy the countersinks to form flush surfaces and to avoid the formation of projecting surfaces which would be liable to cause irritation.

The manner of employing the tool is as follows: After the backing 20 has been applied and the pins 18 of the tooth or tooth-face fitted within the openings 19 the tool is held in the hand of the operator with the jaws 3 and 4 arranged upon opposite sides of the tooth or tooth-face 17 and projecting downwardly or upwardly, accordingly as the tooth is being applied to the lower or upper jaw of the patient, to clear the adjacent natural or artificial teeth, which will occupy the space or opening formed between the jaws, the anvil 11 being arranged to bear upon the front or convex side of the tooth or tooth-face. The pins 18 are then separately riveted by compressing the handles of the tool, which will bring the die or punch head 15 into contact with the exposed free end of the pin, causing the latter to be upset and enlarged, so as to snugly occupy the countersink 21. During this action the tooth or tooth-face is supported against the pressure of the die and prevented from breaking by the anvil 11; but the pivotal connection of said anvil permits of the tool being rocked to a limited extent to slide over and spread the pin and exert a swaging and burnishing action in compressing the pin within the countersink and smoothing off the outer surface thereof to form a flush joint without abrasions or projections, thus obviating all liability of irritation within the mouth and providing a firm and secure connection. This operation may be speedily and easily performed without injury to the tooth or tooth-face, its backing and the bridgework, and without pain to the patient. The angular disposition of the jaws 3 and 4 is such that by simply reversing or changing the position of the anvil and die when required any point within the mouth may be reached.

From the foregoing description, taken in connection with the accompanying drawings, the construction, mode of operation, and advantages of the invention will be readily understood, and it will be seen that a simple and effective construction of tool for the purpose stated is provided. While the preferred embodiment of the invention is as herein disclosed, it will of course be understood that modifications within the scope of the invention may be made without departing from the spirit or sacrificing any of the advantages thereof.

Having thus fully described our invention, what we claim as new, and desire to secure by Letters Patent, is—

1. A dental riveting-tool comprising a pair of pivoted handles provided with opposing jaws segmentally and laterally curved, and a die and anvil carried by said jaws, substantially as described.

2. A dental riveting-tool comprising a pair of pivoted jaws, and a die and an anvil detachably mounted upon the jaws, the mountings for said die and anvil being applicable alike to both jaws, whereby the die and anvil may be interchangeably used on either jaw and reversed as to position, substantially as described.

In testimony whereof we have hereunto set our hands in presence of the subscribing witnesses.

FRANK A. BREWER, Jr.
FRANK A. BREWER, Sr.

Witnesses:
GEO. B. FLETCHER,
WM. FRIEDE,
FRANK MARKETTI.